Oct. 11, 1949.   W. C. SONNIE   2,484,758
FIXTURE FOR MACHINE TOOLS
Filed June 13, 1946   2 Sheets-Sheet 1

Inventor
WILLIAM C. SONNIE
By
Kwis, Hudson, Boughton & Williams
Attorneys

Oct. 11, 1949.   W. C. SONNIE   2,484,758
FIXTURE FOR MACHINE TOOLS
Filed June 13, 1946   2 Sheets-Sheet 2
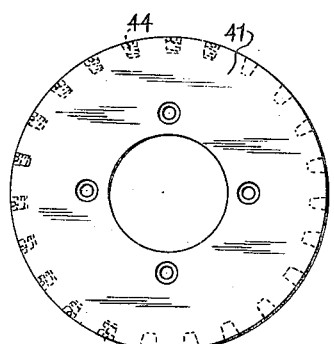
Fig. 8
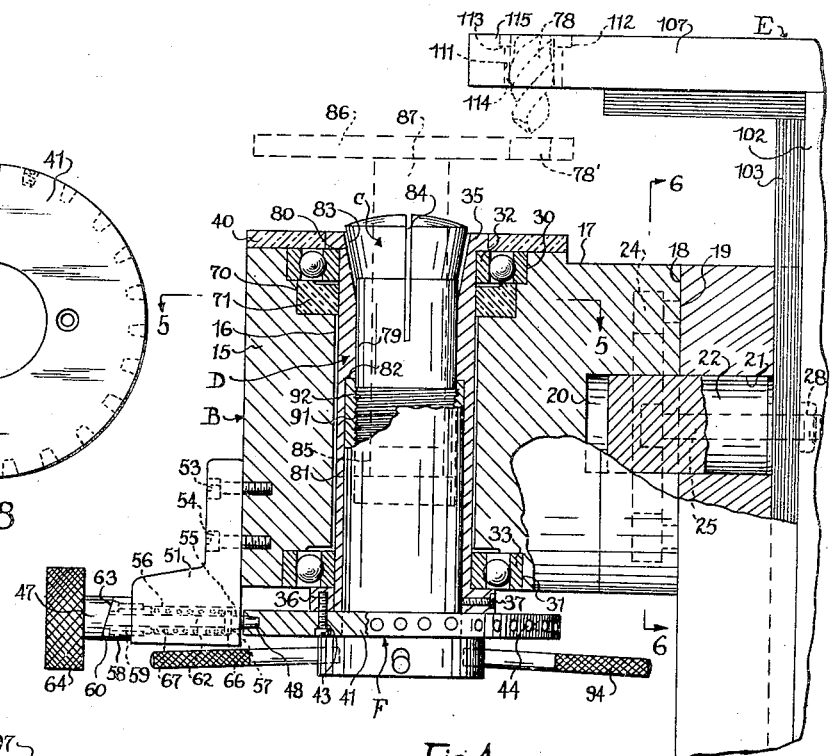
Fig. 4
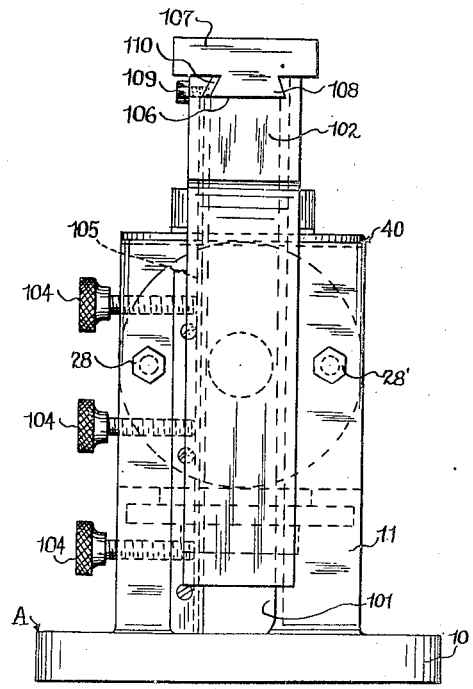
Fig. 7
Fig. 6
Inventor
WILLIAM C. SONNIE
By Kwis, Hudson, Boughton & Williams
Attorneys Patented Oct. 11, 1949

2,484,758

UNITED STATES PATENT OFFICE 2,484,758

FIXTURE FOR MACHINE TOOLS

William C. Sonnie, North Perry, Ohio

Application June 13, 1946, Serial No. 676,509

12 Claims. (Cl. 77—64)

This invention pertains to work holding fixtures for machine tools, and more particularly to a precision universal work holding fixture adapted to support work to be machined and locate it relative to the cutting tool.

An object of this invention is the provision of a new and improved work holding fixture for machine tools which is rugged, compact, and capable of high precision, which is flexible and adaptable to a maximum number of different types of machining operations, and which is capable of quickly locating a cutting tool both angularly and radially relative to a piece to be machined so that a desired machining operation may be accomplished with a minimum of setup time and a maximum of productivity.

A more specific object of this invention is the provision of a new and improved work holding fixture adapted to be positioned on the work table of a machine tool, comprising a base member, a housing member removably and pivotally supported on said base member, a spindle member rotatably positioned in said housing member and journaled against axial movement, index means mounted on said spindle member and said housing member and adapted to angularly position said spindle member, a work holding device positioned in said spindle member and adapted to engage pieces to be machined, and means for operating said work holding device and rotating said spindle member to the desired angular position.

A further object of this invention is the provision of a new and improved universal work holding fixture adapted to be positioned on the work table of a machine tool, comprising a base member, a housing member pivotally mounted on said base member and having a normally vertical bore, a spindle member rotatably positioned in said bore journaled against axial movement and having a bore coaxial with the bore of said housing, indexing means mounted on said housing member and said spindle member and adapted to angularly position said spindle member, a work holding device positioned in said spindle member bore and adapted to clampingly engage pieces to be machined, and tool guide means mounted on said base and adjustable in a plane containing the vertical axis of said housing member, whereby proper positioning of said tool guide member and angular positioning of said spindle member enables the operator to perform machining operations at predetermined distances from a center of rotation and in any desired angular relationship.

Still another object of this invention is the provision of a new and improved work holding fixture adapted to be positioned on the work table of a machine tool, comprising a housing member, a spindle member rotatably positioned in said housing member journaled against axial movement and having a bore outwardly tapered at one end and enlarged at the other end forming a shoulder internally of the bore, index means for selectively positioning said spindle member in any desired angular position, a work holding device positioned in said spindle member bore having an outwardly tapered surface engaging the tapered surface of said spindle member bore and adapted upon axial movement to clampingly engage pieces to be machined, and a collar having a handle operatively connected with said work holding device to move it axially and bearing against said shoulder, said collar being frictionally engaged with said spindle member after operating said work holding device whereby further movement of said handle may rotate the piece to any desired angular position.

Still another object of this invention is the provision of a new and improved work holding fixture adapted to be positioned on the work table of a machine tool, comprising a base member, a housing member mounted on said base member, a spindle member rotatably supported on said housing member and journaled against axial movement, a work holding device mounted on said spindle member and adapted to clampingly engage pieces to be machined, an index plate mounted on said spindle member and having spaced index holes, an index key housing member mounted on said first mentioned housing member and having a bore in the path of movement of said index holes, said index key housing member having an inclined cam surface adjacent one end of said bore, a key member positioned in said bore adapted to engage said index holes and having a complementary inclined cam surface whereby rotation of said key member withdraws said key from said index holes and permits rotation of said pieces to different and predetermined new angular positions.

Other and more specific objects of this invention will appear from a reading and understanding of the specification describing this invention and the drawings illustrating same which are a part thereof, wherein:

Fig. 4 is an enlarged and sectionalized side view of the fixture, showing the operative arrangement of the parts with a piece to be machined mounted directly in the work holding device;

Fig. 6 is a sectional view on the line 6—6 of Fig. 4;

Fig. 7 is a rear view; and

Fig. 8 is a detached plan view of the index plate.

Figures 1, 2, 3, 5:
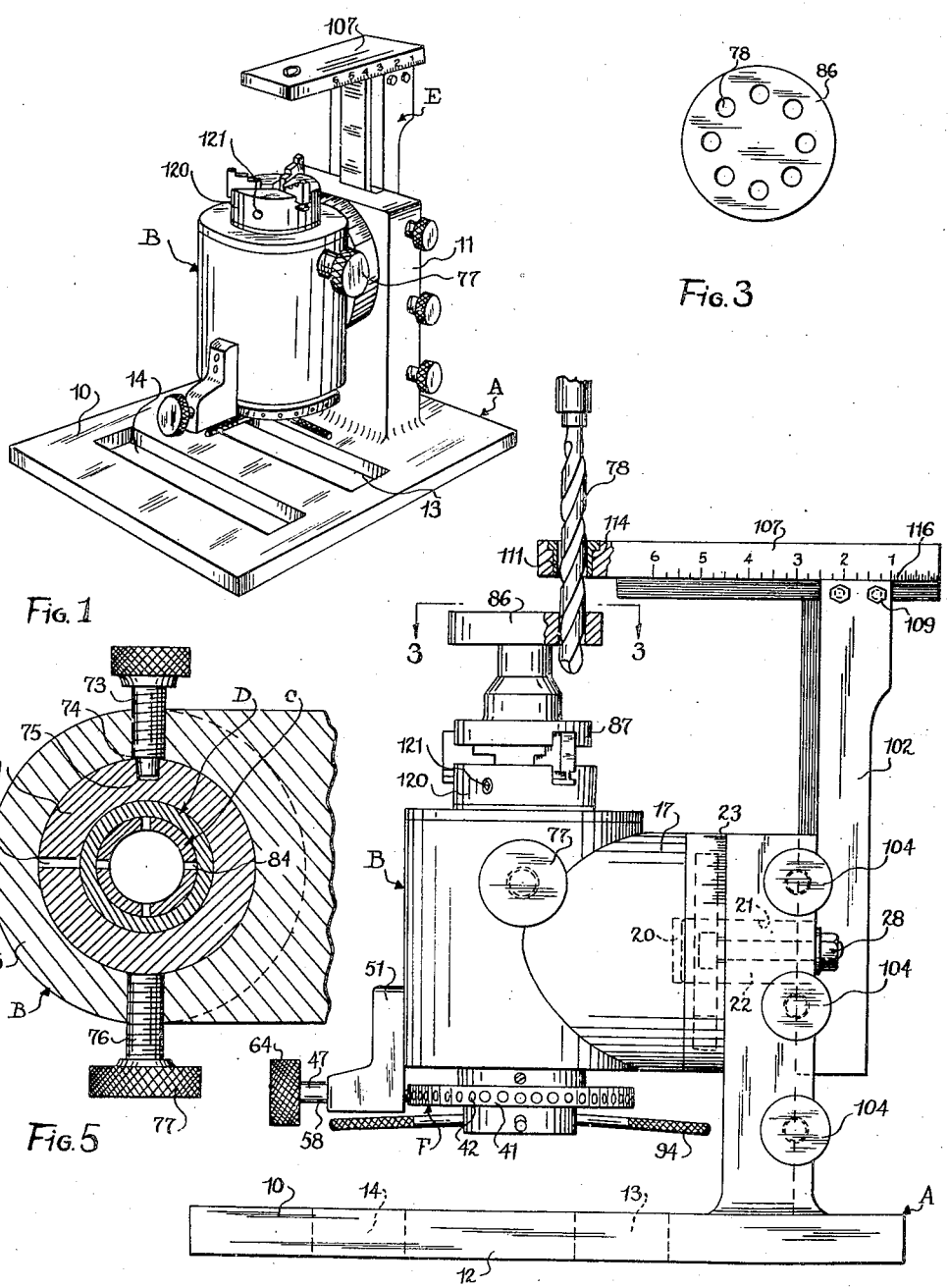
Fig. 1 shows a perspective view of a work holding fixture embodying the present invention showing a three-jawed chuck ready to receive a piece to be machined.
Fig. 2 is a side view of the fixture shown in Fig. 1, showing a piece to be machined mounted in the chuck with a cutting tool in operative position.
Fig. 3 is a view on the line 3—3 of Fig. 2, showing the part to be machined completed and ready for removal from the fixture.
Fig. 5 is a sectional view on the line 5—5 of Fig. 4.

Referring to the drawings, the work holding fixture shown comprises generally a base member A supporting a housing member B, a work holding device C rotatably journaled in the housing member B by means of a spindle member D, a tool guide support E, and indexing means F for angularly positioning the piece to be machined relative to the cutting tool.

As shown, the base member A comprises a base plate 10 and a back plate 11 extending upwardly from the upper surface of the base plate, preferably at right angles thereto. The base plate 10 is adapted to support the work holding fixture on the work table of a machine tool and has a bottom surface 12, which is preferably machined or ground smooth and plane, and transverse slots or passages 13 and 14 which provide a passage through the base plate for clamps or other means (not shown) to secure the work holding fixture on the work table. If desired, such work clamps may also be positioned around the outer edge of the base plate. The shape of the plate 10 and its thickness is immaterial, but as shown is rectangular and of such a thickness as to give proper strength and rigidity to the fixture.

The back plate 11 is adapted to rotatably support the housing member B relative to the base plate 10 as well as to adjustably support the tool guide support E. The back plate 11 may be either formed integral with the base plate 10 or made separately and welded or otherwise attached to the base plate.

In the embodiment shown, the housing member B comprises a generally cylindrical sleeve 15 having an elongated bore 16 and a large boss 17 extending from one side of the sleeve. The end of the boss 17 and the back plate 11 have complementary flat bearing surfaces 18 and 19 respectively in engagement and centrally positioned apertures 20 and 21 respectively in which a pin boss 22 is positioned and serves as a journal upon which the housing member B may be turned. In this connection, it has been found preferable to so form the relative diameters of the aperture 21 and the pin boss 22 that the latter must be press fitted into the aperture 21. This prevents the possibility of loss of the pin boss and increases the accuracy of support of the housing member.

It is desirable that the axis of the housing member bore 16 be turnable or rotatable in a plane perpendicular to the plane of the bottom surface 12, and to accomplish this the axis is made parallel to the surface 18 on the end of the boss 17. Similarly, the plane of the surface 19 on the back plate 11 is made perpendicular to and the axes of the apertures 20 and 21 are parallel with the plane of the bottom surface 12 of the base plate 10. Indicia 23 on the boss 17 indicate the angle the axis of the bore 16 makes relative to the plane of the bottom surface 12. At one point in the rotation of the housing member on the pin boss 22, the axis will be perpendicular to the plane of the bottom surface 12, and this position is referred to in this specification as the vertical position.

Suitable means are provided to support the housing member B and maintain it in any adjusted position on the back plate 11. Such means comprise a T-slot 24 having flanges 27 formed in the surface 18 and a pair of bolts 25, 25' mounted on the back plate 11 with heads 26, 26' extending into the T-slot and engaging the inner edges of the flanges. Nuts 28, 28' threaded on the opposite end of the bolts serve to draw the bolts tight and firmly secure the housing member B in any adjusted angular position. As shown, the bolts are horizontally aligned.

To provide for removal of the housing member B from the back plate 11, the flanges 27 are broken away at 29, 29' each diametrically opposite from each other. As the bolts 25, 25' are horizontally positioned relative to each other and it is contemplated that the housing member will normally be used with the axis of the bore 16 in either the vertical or the near-vertical position, the broken away portions 29, 29' are located on the plane of the axis of the bore. Thus, if the nuts 28, 28' are loosened, the housing member B may be rotated through an angle of 90° from its normal position and readily disengaged from the bolt heads 26, 26'. The housing member when so removed may be positioned on the work table of a machine tool with the bearing surface 18 in engagement with the upper surface of the work table and the axis of the bore 16 horizontal. Preferably the machine tool should be of a type having a magnetic chuck for maintaining the housing member in position thereon.

As shown, the bore 16 of the housing member B is adapted to receive and have rotatably supported therein the spindle member D. Preferably the bore 16 has recesses 30, 31 in each end and suitable ball or antifriction bearings 32, 33 positioned therein. The spindle member D is rotatably journaled in the bore 16 on the bearings 32, 33 and has a flange 35 at one end which bears against the bearing 32 and journals the spindle member against axial movement in one direction. To prevent axial movement in the opposite direction, a flange or collar 36 fits over the end of the spindle member, bears against the bearing 33, and is fixedly attached to the spindle member by means of screws 37. Preferably a washer 40 of either metallic or non-metallic material is coaxial with the flange 35 and is positioned on top of the housing member adjacent the bearing 32 for preventing dirt or metallic chips from entering the bearing.

For angularly positioning the spindle member D, an index plate 41 generally circular in outline and having equally spaced tapered holes 42 on the outer circumference is preferably fixedly mounted on the spindle member by means of screws 43 extending into the flange 36. Any number of index holes 42 may be provided on the circumference of the index plate as will be necessary for the satisfactory operation of the fixture. In the embodiment of the invention shown, there are 24 equally spaced index holes, providing an angular spacing of 15°. Of course, if 10° spacing were desired 36 holes could be provided. In any event, it is considered desirable to have as large a number of holes as is commensurate with mechanical strength and manufacturing costs. Preferably the index holes are threaded at the base and plugs 44 similarly threaded and of a length to be flush with the surface of the plate may be inserted in the holes not needed for a particular machining operation.

An index key member 47 having a tapered end 48 adapted to selectively engage the index holes 42 is retractably supported in relation to the index plate 41 by means of an index key housing member 51 mounted on the side of the housing member B by means of threaded screws 53, 54. The member 51 has a horizontally extending bore 55 aligned with the index holes 42 with an enlargement 56 forming a shoulder 57 internally of the bore. A guide member 58 extends into the enlarged bore 56 with a guide bore 49 and a cam surface 60 angularly disposed to the axis of the bore. The index key member 47 has a shaft 62 which is rotatably and slidably mounted in the bores 55 and 59, and a cam surface 63 in operative engagement with the cam surface 60 whereby rotation of the key member using the knurled knob 64 effects a retractive movement of the shaft 62 sufficient to withdraw the tapered portion 48 extending into the index holes 42 and permit rotation of the spindle member D. A coil spring 67 surrounds the shaft 62 and at its ends bears against the guide member 58 and a flange 66 on the shaft 62, yieldingly and resiliently urging the key member 47 into engagement with the index plate 41. The flange 66 is so positioned on the shaft 62 that it also engages the shoulder 57 and limits the movement of the key member 47.

The engagement of the tapered end 48 in the index holes 42 effectively locks the spindle member against rotation in any desired position. However, it is also desirable that undue wear of the index pin and the index holes be prevented and that the strain of the machining operations not be imposed thereon. Accordingly, in the embodiment shown, a circular locking ring 71 having a gap 72 at one point in its circumference is positioned in a recess 70 intermediate the housing member bore and the spindle member. A dog-nosed screw 73 is threadably mounted in the housing with an end 74 engaging in an aperture 75 in the side of the ring 71 and keys the ring relative to the housing. A screw 76 having a knurled handle 77 is positioned diametrically opposite from the screw 73 and engages the outer surface of the locking ring 71. By tightening down on this screw, the locking ring 71 is forced into frictional engagement with the sides of the spindle member and effectively locks the spindle member in any position indicated by the indexing means, relieving the strain of the machining operations from the indexing means.

As shown, the spindle member D has an elongated bore 79 coaxial with the bore 16 of the housing member, which bore has an outwardly extending taper 80 at one end and an enlargement 81 at the opposite end forming a shoulder 82 interiorly of the bore. The work holding device C, having a bore 85 coaxial with the bore 16 of the housing, is positioned in the spindle member bore with an outwardly tapered surface 83 in engagement with the tapered surface 80. As shown, the work holding device C has a plurality of vertical slots 84 extending through the side walls and adapted to permit the diameter of the bore 85 to be decreased upon downward axial movement of the work holding device due to the coaction of the tapered surfaces 80, 83. Thus the piece to be machined 86 having a boss 87 may be clampingly engaged and supported in position in the bore 85. A collar 90, positioned in the spindle member bore and engaging the shoulder 82, has threads 91 in engagement with similar threads 92 on the work holding device. The collar 90 extends out of the spindle member bore beyond the index plate and has a handle 94. Operation of the handle rotates the collar 90 and retracts the work holding device into the spindle member bore, which then clampingly engages the piece to be machined positioned therein.

After the handle 94 has been operated to retract the work holding device and clamp the piece, the collar 90 is frictionally engaged with the spindle member D and the handle 94 may then be utilized for rotating the spindle member to any desired angular position, provided of course that the locking ring 71 and the index key 47 are first disengaged.

As shown, the back plate 11 on the side opposite to which the housing member is mounted has a vertically extending dovetail shaped guideway 101 with an upright 102 having a complementary dovetail 103 slidably positioned therein. Screw means 104 bearing on a gib 105 positioned in the guideway 101 clamp the upright in any adjusted position. The upright 102 has a horizontally extending dovetail groove 106 in its upper end with a crossbar 107 having a complementary dovetail 108 slidably mounted therein. A threaded bolt 109 in the upright 102 and acting to bear on a gib 110 serves to clamp the crossbar in any adjusted position. In the embodiment shown, the crossbar 107 is provided at one end with a vertical bore 111 having an enlargement 112 at the upper end forming a shoulder 113. A drill guide 114 having a complementary enlargement and shoulder 115 may be slidably inserted to the bore 111. Drill guides of the correct size for the drill or other tool which will be utilized in the machining operation may be inserted therein with the shoulders 113 and 115 coacting and preventing accidental displacement of the guide.

In the use of the drill guide, the housing member is normally positioned on the back plate 11 using the indicia 23 provided, so that the axis of the spindle member bore is vertical. As stated, the upright 102 is also vertically adjustable. Thus, vertical movement of the upright will move the axis of the drill guide in a line parallel to the axis of rotation of the spindle member. Preferably the drill guide bore 111 is positioned laterally on the crossbar 107 so that as the crossbar is horizontally adjusted the axis of the drill guide bore will always move in a plane which contains the axis of the spindle member.

In the embodiment shown, the crossbar is provided with indicia 116 which indicate the exact distance of the drill guide axis from the center of rotation of the spindle member. Thus, an operator desiring to drill a hole one inch from the center of the piece to be machined need merely adjust the crossbar so that one inch is indicated thereon, engage the piece to be machined in the work holding device, place the fixture under a drill press, and move the drill axially through the proper sized drill guide into the piece.

One of the operations which the work holding fixture of this invention is adapted to accomplish is to drill a plurality of holes spaced from and angularly positioned about a center of rotation. To do this the operator first adjusts the crossbar to the desired radial distance from the center of rotation as described above. The upright 102 is adjusted to the proper height permitting the piece to be inserted in the work holding device. After the piece is inserted the handle 94 is rotated, drawing the work holding device axially and clamping the piece in position. The locking ring 71 is tightened using the screw 76. The cutting tool 78 is advanced through the tool guide and the machining operation, such as drilling a hole 78', accomplished. The locking ring 71 is released and the index key 47 is retracted either by pulling it directly or by rotating it and utilizing the cam surfaces 60 and 63 to perform the retracting operation. The handle 94 is then operated which rotates the spindle member D because of the frictional engagement between the shoulder 82 and the spindle member D as described above. When the spindle member has been rotated to approximately the desired angular position, the index key member 47 is released and allowed to engage the proper index hole and accurately position the spindle member relative to the tool. The locking ring is then engaged with the spindle member and the machining operation again performed. This same procedure is repeated until all of the cutting operations desired have been made. After the last operation has been performed, the locking ring is allowed to remain locked with the spindle member. Rotation of the handle 94 in the proper direction then releases the work holding device from the piece being machined and a new piece may be inserted. The handle is rotated in the opposite direction clamping the new piece, and the entire procedure again repeated.

It will be obvious that by rotating the collar member a sufficient distance in one direction the threads will be entirely disengaged from the work holding device C and a new work holding device having a different internal diameter may be easily substituted. Thus the fixture permits machining operations on work having varying diameters.

It is possible that it will be desired to perform machining operations on work having a larger diameter than the diameter of the spindle member bore. In this event, other work holding devices such as the three-jawed chuck 120 may be positioned in the work holding device C and engaged in the work holding device C as though it were the piece to be machined. Subsequent to this, the handle 94 would be used only to rotate the spindle member to the desired angular position. A suitable key (not shown) inserted in the opening 121 would be utilized for clamping the piece to be machined.

Should the operator desire to machine a surface on the piece at an angle to the bore of the housing member, such as by using a milling machine or a grinder, the upright 102 may be removed from the back plate 11 and the fixture used without the tool guide E. Loosening the nuts 28, 28' permits rotation of the housing member to the desired angle using the indicia 23 as a guiding means and retightening the nuts locks the housing member in that angular position. It will, of course, be appreciated that the indexing means may still be utilized if a plurality of machined surfaces angularly positioned around the piece are desired.

It may also be desired to machine pieces in a machine tool which normally has a low clearance between the upper surface of the work table and the tool. This often occurs in grinding machines. In this event the nuts 28, 28' may be loosened, the housing member rotated through an angle of 90°, and removed from the back plate by allowing the heads 26, 26' of the bolts 25, 25' to pass through the openings 29, 29' provided in the T-slot 24. The housing member may then be placed on the work table of the machine tool with the bearing surface 18 in engagement with the upper surface of the work table. The housing member D may be clamped on the work table using any well known means of clamping. However, a work table having a magnetic chuck is preferred. Again any desired number of surfaces or other machining operations may be performed, and the indexing means may be utilized to angularly position each surface machined relative to the other.

Thus it will be seen that there has been provided a work holding fixture adapted to be positioned on the work table of a machine tool which is capable of performing a multitude of functions, which is highly accurate, which will enable a particular machining operation to be set up quickly and accurately, and which will enable an operator to produce a maximum number of machined parts with a minimum of time and effort.

While by way of illustration and example the invention has been described in connection with a preferred embodiment thereof as to structure and the preferred manner as to its use, it will be obvious to those skilled in the art after understanding the foregoing that various changes and modifications may be made without departing from the spirit or scope of the invention and it is my intention in the appended claims to cover all such modifications and changes.

Having thus described my invention, I claim:

1. In a work holding fixture adapted to be positioned on the work table of a machine tool, a housing member having a bore, a spindle member rotatably positioned in said bore journaled against axial movement and having a bore coaxial with the bore of said housing, index means on said spindle member and said housing member for angularly positioning said spindle member, means for locking said spindle member against rotational movement in any indexed position, a work holding device positioned in said spindle member bore and adapted to clampingly engage work to be machined, means for operating said work holding device, the last-mentioned means and said spindle member having cooperating surfaces which are interengaged by operation of the last-mentioned means to effect clamping of work in said work holding device whereby rotation of said last-mentioned means after work is clamped in said work holding device is effective to rotate said spindle member and work relative to said housing when said index means and said locking means are unengaged.

2. In a work holding fixture adapted to be positioned on the work table of a machine tool, a housing member having a bore, a spindle member rotatably positioned in said bore journaled against axial movement and having a bore coaxial with said housing bore, index means on said spindle member and said housing member for selectively and angularly positioning said spindle member, means for locking said spindle member against rotational movement in any indexed position, a work holding device positioned in said spindle member bore and adapted to clampingly engage work to be machined, means in said spindle member bore for operating said work holding device, the last-mentioned means and said spindle member having cooperating surfaces which are interengaged by operation of the last-mentioned means in clamping work in the work holding device, the said interengagement permitting rotation of said spindle member by rotation of said last-mentioned means, and means including a tool guide adjustable in a plane including the axis of rotation of said spindle member for positioning a tool relative to work positioned in said work holding device.

3. In a working holding fixture adapted to be positioned on the work table of a machine tool, a housing member having a bore, a spindle member rotatably positioned in said bore journaled against axial movement and having a bore coaxial with said housing bore, index means on said spindle member and said housing member for selectively and angularly positioning said spindle member, means for locking said spindle member against rotational movement in any indexed position, a work holding device positioned in said spindle member bore and adapted to clampingly engage work to be machined, means in said spindle member bore for operating said work holding device, the last-mentioned means and said spindle member having cooperating surfaces which are interengaged by operation of the last-mentioned means in clamping work in the work holding device, the said interengagement permitting rotation of said spindle member by rotation of said last-mentioned means, an upright vertically adjustable in a plane containing the axis of rotation of said spindle member, a crossbar mounted on said upright and horizontally adjustable in said plane and having a tool guide, whereby said tool guide is horizontally and vertically adjustable in said plane passing through the axis of rotation of said spindle member.

4. A work holding fixture adapted to be positioned on the work table of a machine tool, comprising a base member having a vertically extending back, a housing member mounted on said back and having a bore, a spindle member rotatably positioned in said bore journaled against axial movement and having a bore coaxial with said housing bore, an index plate on said spindle member and having spaced index holes, means including a retractable member for selectively engaging said index holes and angularly engaging said spindle member, other means for locking said spindle member against rotational movement in any indexed position, a work holding device positioned in said spindle member bore, means for operating said work holding device, the last-mentioned means and said spindle member having cooperating surfaces which are interengaged by operation of the last-mentioned means in clamping work in the work holding device, the said interengagement permitting rotation of said spindle member by rotation of said last-mentioned means, an upright mounted on said vertically extending support and vertically adjustable, a crossbar mounted on said upright horizontally adjustable and having a tool guide, said tool guide being movable vertically and horizontally in a plane which includes the axis of rotation of said spindle member.

5. A work holding fixture adapted to be positioned on the work table of a machine tool, comprising a base member having a vertically extending support, a housing member mounted on said support and having a vertical bore, a spindle member rotatably positioned in said bore journalled against axial movement and having a bore coaxial with said housing bore, an index plate on said spindle member and having spaced index holes, means including a retractable member for selectively engaging said index holes and angularly positioning said spindle member, other means for locking said spindle member against rotational movement in any indexed position, a work holding device positioned in said spindle member bore, means for operating said work holding device, the last-mentioned means and said spindle member having cooperating surfaces which are interengaged by operation of the last-mentioned means in clamping work in the work holding device, the said interengagement permitting rotation of said spindle member by rotation of said last-mentioned means, said vertically extending support having a vertical guideway, an upright positioned in said guideway and vertically adjustable, means for locking said upright in any adjusted position, said upright having a horizontal guideway, a crossbar positioned in said guideway and horizontally adjustable, means for locking said crossbar in any adjusted position, a tool guide in said crossbar and movable in a plane containing the center of rotation of said spindle member by relative adjustment of said upright and said crossbar.

6. In a work holding fixture adapted to be positioned on the work table of a machine tool, a housing member having a vertical bore, a spindle member rotatably positioned in said bore journaled against axial movement and having a bore coaxial with said housing bore, an index plate on said spindle member and having spaced index holes, a second housing member on said first mentioned housing member having a bore aligned with said index holes, a retractable member positioned in said bore and engageable in said index holes for angularly positioning said spindle member, resilient means yieldingly urging said retractable member into said engagement, means for locking said spindle member against rotational movement in any indexed position, a work holding device positioned in said spindle member bore and adapted to clampingly engage work to be machined, and rotatable means in said spindle member bore for operating said work holding device, said rotatable means and said spindle member having cooperating surfaces which are frictionally engaged by operation of said rotatable means to effect clamping of work in the work holding device whereby said rotatable means is effective to rotate said spindle member when said retractable member and the locking means are unengaged.

7. In a work holding fixture adapted to be positioned on the work table of a machine tool, a housing member having a vertical bore, a spindle member rotatably positioned in said bore journaled against axial movement and having a bore coaxial with said housing bore, an index plate on said spindle member and having spaced index holes, a second housing member on said first housing member and having a bore aligned with the path of movement of said index holes, said second housing member also having a cam surface angularly disposed to the axis of said bore, a retractable member rotatably and slidably positioned in said bore adapted to engage said index holes and angularly position said spindle member, said retractable member also having an angularly disposed cam surface adapted to engage said second housing member cam surface whereby rotation of said retractable member causes said member to be retracted from said index holes, and resilient means yieldingly urging said retractable member into said index holes and said cam surfaces into engagement with each other, means for locking said spindle member against rotational movement in any indexed position, a work holding device positioned in said spindle member bore and adapted to clampingly engage work to be machined, and rotatable means in said spindle member bore for operating said work holding device, said rotatable means and said spindle member having cooperating surfaces which are frictionally engaged by operation of said rotatable means to effect clamping of work in the work holding device whereby said rotatable means is effective to rotate said spindle member when said retractable member and the locking means are unengaged.

8. A work holding fixture adapted to be positioned on the work table of a machine tool, comprising a housing member having a vertical bore, a spindle member rotatably positioned in said bore journaled against axial movement and having a bore coaxial with said housing bore, an index plate on said spindle member and having spaced index holes, means including a retractable member for selectively engaging said index holes and angularly positioning said spindle member, a locking ring intermediate said housing and said spindle member and fixed against rotation relative to said housing, and means operable exteriorly of the housing for forcing said locking ring into locking engagement with said spindle member and locking said spindle member against rotational movement in any indexed position, a work holding device positioned in said spindle member bore and adapted to clampingly engage work positioned therein, means positioned within said spindle member bore for operating said work holding device, said last-mentioned means and said spindle member having cooperating surfaces which are interengaged by operation of the last-mentioned means to effect clamping of work in said work holding device whereby rotation of said last-mentioned means after work is clamped in said work holding device is effective to rotate said spindle member when the retractable member and the locking ring are unengaged.

9. A work holding fixture adapted to be positioned on the work table of a machine tool, a housing member having a vertical bore, a spindle member rotatably positioned in said bore and journaled against axial movement, said spindle member also having a bore coaxial with said housing bore outwardly tapered at one end, an index plate on said spindle member and having spaced index holes, means including a retractable member for selectively engaging said index holes and angularly positioning said spindle member, means for locking said spindle member against rotational movement in any indexed position, a work holding device positioned in said spindle member bore and having an outwardly tapered surface engaging the tapered surface of said spindle member bore, said work holding device adapted upon axial movement to clampingly engage work to be machined, and rotatable means positioned within said spindle member bore adapted when rotated to move said work holding device axially and operate said work holding device, the said rotatable means and said spindle member having cooperating surfaces which are frictionally engaged by operation of said rotatable means to effect clamping of work in the work holding device whereby said rotatable means is effective to rotate said spindle member when said retractable member and the locking means are unengaged.

10. A work holding fixture adapted to be positioned on the work table of a machine tool, a housing member having a vertical bore, a spindle member rotatably positioned in said bore and journaled against axial movement, said spindle member also having a bore coaxial with said housing bore outwardly tapered at one end, an index plate on said spindle member and having spaced index holes, means including a retractable member for selectively engaging said index holes and angularly positioning said spindle member, means for locking said spindle member against rotational movement in any indexed position, a work holding device having an outwardly tapered surface positioned in said spindle member bore with the tapered surfaces in engagement, said work holding device having a bore coaxial with said housing bore and vertically extending slots through said tapered portion whereby the diameter of said bore may be decreased upon axial movement of said work holding device relative to said spindle member bore, and rotatable means for moving said work holding device axially to clamp work positioned in said work holding device, the said rotatable means and said spindle member having cooperating surfaces which are frictionally engaged by operation of said rotatable means to effect clamping of work in the work holding device whereby said rotatable means is effective to rotate said spindle member when said retractable member and the locking means are unengaged.

11. A work holding fixture adapted to be positioned on the work table of a machine tool, a housing member having a vertical bore, a spindle member rotatably positioned in said bore and journaled against axial movement, said spindle member also having a bore coaxial with said housing bore outwardly tapered at one end and enlarged at the other end forming a shoulder internally of the bore, an index plate fixedly mounted on said spindle member and having spaced index holes, means including a retractable member for selectively engaging said index holes and angularly positioning said spindle member, means for locking said spindle member against rotational movement in the position indicated by said indexing means, a work holding device having an outwardly extending taper positioned in said spindle member bore with said tapered surfaces in engagement, said work holding device having a work receiving bore coaxial with said housing member bore, a collar rotatably journaled in said spindle member bore and bearing at one end against said shoulder and operatively engaged with said work holding device whereby rotation of said collar moves said work holding device axially and clamps work to be machined in said work holding bore and also frictionally engages the collar with said spindle member, further rotation of said collar rotating a spindle member to any desired position when the retractable member and the locking ring are unengaged.

12. A work holding fixture adapted to be positioned on the work table of a machine tool, comprising a base member having a vertically extending support, a housing member removably and rotatably mounted on said support and having an elongated vertical bore, means to lock said housing member to said support in a selected rotated position of the former relative to the latter, a spindle member rotatably positioned in said bore journaled against axial movement and having a bore coaxial with said housing member bore, means for selectively and angularly positioning said spindle member, means for locking said spindle member against rotational movement in any desired position, means within said spindle member bore adapted to removably secure work to be machined, and means for operating said last mentioned means, said operating means and said spindle member having cooperating surfaces which are interengaged by actuation of the said operating means to effect clamping of work in the work securing means whereby rotation of said operating means after work is clamped in said work securing means is effective to rotate said spindle member when said positioning means and said locking means are unengaged with the spindle member.

WILLIAM C. SONNIE.

REFERENCES CITED

The following references are of record in the file of this patent:

UNITED STATES PATENTS

| Number | Name | Date |
| --- | --- | --- |
| 420,715 | Braun | Feb. 4, 1890 |
| 1,260,130 | Bemis | Mar. 19, 1918 |
| 2,295,022 | Yanchek | Sept. 8, 1942 |
| 2,388,320 | Gardiner | Nov. 6, 1945 |
| 2,431,594 | Wernig | Nov. 25, 1947 |